US012797746B2

(12) United States Patent
Kurabayashi

(10) Patent No.: US 12,797,746 B2
(45) Date of Patent: Nov. 17, 2026

(54) SYSTEM, METHOD, AND PROGRAM FOR INSPECTING GAME

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 84 days.

(21) Appl. No.: 19/170,712

(22) Filed: Apr. 4, 2025

(65) Prior Publication Data

US 2025/0229186 A1 Jul. 17, 2025

Related U.S. Application Data

(63) Continuation of application No. PCT/JP2023/038505, filed on Oct. 25, 2023.

(30) Foreign Application Priority Data

Oct. 28, 2022 (JP) ................................. 2022-173314

(51) Int. Cl.

| | |
|---|---|
| ***A63F 13/67*** | (2014.01) |
| ***A63F 13/35*** | (2014.01) |
| ***A63F 13/79*** | (2014.01) |
| ***A63F 13/822*** | (2014.01) |
| ***G06F 11/3668*** | (2025.01) |
| ***G06F 11/3698*** | (2025.01) |

(52) U.S. Cl.

CPC .............. *A63F 13/67* (2014.09); *A63F 13/79* (2014.09); *A63F 13/822* (2014.09); *G06F 11/368* (2013.01); *G06F 11/3698* (2025.01); *A63F 13/35* (2014.09)

(58) Field of Classification Search

None

See application file for complete search history.

(56) References Cited

U.S. PATENT DOCUMENTS

| | | | | |
|---|---|---|---|---|
| 2020/0159644 A1* | 5/2020 | Beltran | .................. | A63F 13/23 |
| 2021/0001231 A1* | 1/2021 | Kurabayashi | ........... | G06F 11/36 |

(Continued)

FOREIGN PATENT DOCUMENTS

| | | | |
|---|---|---|---|
| CN | 106407115 A * | 2/2017 | ............ G06F 11/368 |
| CN | 109857439 A * | 6/2019 | |
| CN | 110457211 A * | 11/2019 | .......... G06F 11/3688 |

(Continued)

*Primary Examiner* — Ricky Chin

(74) *Attorney, Agent, or Firm* — Osha Bergman Watanabe & Burton LLP

(57) ABSTRACT

One or more embodiments of the invention is a system for detecting inter-version inconsistency of a game in which a game state can be updated according to a user operation, and the system includes: a first processing unit for executing the game of a first version by using a virtual instance, executing gameplay on the basis of an operation log included in one game log, and acquiring a game state; a second processing unit for executing the game of a second version by using a virtual instance, executing gameplay on the basis of an operation log included in the one game log, and acquiring a game state; and an inconsistency detection unit for detecting inter-version inconsistency on the basis of comparison between the game state acquired by the first processing unit and the game state acquired by the second processing unit.

9 Claims, 7 Drawing Sheets

(56) References Cited

U.S. PATENT DOCUMENTS

| | | | | |
|---|---|---|---|---|
| 2021/0346798 | A1* | 11/2021 | Borovikov | A63F 13/35 |
| 2025/0229186 | A1* | 7/2025 | Kurabayashi | A63F 13/67 |

FOREIGN PATENT DOCUMENTS

| | | | | | |
|---|---|---|---|---|---|
| CN | 112153374 | A | * | 12/2020 | H04N 21/4325 |
| CN | 112306850 | A | * | 2/2021 | G06F 11/3688 |
| CN | 112597057 | A | * | 4/2021 | G06F 11/368 |
| CN | 112604298 | A | * | 4/2021 | A63F 13/77 |
| CN | 112717416 | A | * | 4/2021 | A63F 13/70 |
| CN | 113996066 | A | * | 2/2022 | G06F 8/658 |
| CN | 115129398 | A | * | 9/2022 | A63F 13/60 |
| CN | 115329155 | A | * | 11/2022 | G06F 16/903 |
| CN | 115510454 | A | * | 12/2022 | A63F 13/79 |
| JP | 6438612 | B1 | | 12/2018 | |
| JP | 2021145939 | A | * | 9/2021 | A63F 13/77 |
| WO | WO-2019195169 | A1 | * | 10/2019 | A63F 13/56 |

* cited by examiner

SYSTEM, METHOD, AND PROGRAM FOR INSPECTING GAME

TECHNICAL FIELD

The present invention relates to a system, a method, and a program for inspecting a game and particularly to a system, a method, and a program for detecting inter-version inconsistency of a game.

BACKGROUND ART

Recently, there is an increasing number of players who enjoy online games in which a plurality of players can participate via a network. Such a game is realized by a game system, etc. in which a portable terminal device carries out communication with a server device of a game administrator, thereby allowing the player who operates the portable terminal device to play a battle against another player. In providing such a game, the game administrator needs to inspect the game programs and detect bugs. For example, PTL 1 discloses a system, etc. that allows game programs to be inspected by estimating the actions that are highly likely to be performed by a user.

CITATION LIST

Patent Literature

[PTL 1]
Publication of Japanese Patent No. 6438612

SUMMARY OF INVENTION

Technical Problem

As an online game, there is a well-known card game called a digital collectible card game (DCCG), in which various actions are executed in accordance with combinations of cards, characters, etc. (hereinafter, referred to as "card combinations"). For example, regarding an online game that is under commercial operation over a long period of time, a version upgrade, etc. of the game app may lead to game behavior (game rule) changes that are not intended by the developer as a result of implementation, debugging, or library specification changes in the game app. Also, once implementation of a game with behaviors that deviate from the intention of the developer is released and prevails among users, subsequent implementation of the game with the originally intended behaviors may result in the users recognizing that behaviors in the game have been changed. So far, only manual confirmation has been practical means for detecting such unintended inter-version behavior changes of a game, namely, inter-version inconsistency of the game. However, for example, many DCCGs involve an exploding increase in the number of kinds of cards, making it impossible to exhaustively confirm such inconsistency.

In one aspect, the present invention has been conceived in order to solve these problems, and an object thereof is to provide a system for allowing a game to be inspected.

Solution to Problem

[1] A system according to an embodiment of the present invention is a system for detecting inter-version inconsistency of a game in which a game state can be updated according to a user operation, and the system includes:

a first processing unit for executing the game of a first version by using a virtual instance generated to virtualize a user terminal or a software environment for the user terminal, executing gameplay on the basis of an operation log included in one game log, and acquiring game state information;

a second processing unit for executing the game of a second version by using a virtual instance, executing gameplay on the basis of an operation log included in the one game log, and acquiring game state information; and an inspection unit for detecting inter-version inconsistency on the basis of comparison between the game state information acquired by the first processing unit and the game state information acquired by the second processing unit.

[2] An embodiment of the present invention is the system recited in [1], wherein the game may be a battle game, the one game log may include operation logs of a first user and a second user matched against each other, the first processing unit may execute the game of the first version by using two virtual instances, match the two virtual instances against each other, execute gameplay in one of the two virtual instances on the basis of the operation log of the first user included in the one game log, execute gameplay in the other virtual instance on the basis of the operation log of the second user included in the one game log, and acquire game state information, and the second processing unit may execute the game of the second version by using two virtual instances, match the two virtual instances against each other, execute gameplay in one of the two virtual instances on the basis of the operation log of the first user included in the one game log, execute gameplay in the other virtual instance on the basis of the operation log of the second user included in the one game log, and acquire game state information.

[3] An embodiment of the present invention is the system recited in [2], wherein the system may acquire the operation log of the first user and the operation log of the second user from an acquired game log.

[4] An embodiment of the present invention is the system recited in any one of [1] to [3], wherein the game log of the game may be a game log acquired as a result of a user playing the game of the first version.

[5] An embodiment of the present invention is the system recited in any one of [1] to [4], wherein the game state information may be data that can be output in a predetermined format, the first processing unit and the second processing unit may acquire a plurality of respective items of game state information obtained according to gameplay that is executed, and the inspection unit may detect inter-version inconsistency on the basis of a degree of matching between the game state information acquired by the first processing unit and the corresponding game state information acquired by the second processing unit.

[6] An embodiment of the present invention is the system recited in any one of [1] to [5], wherein the first processing unit and the second processing unit may execute the game in the virtual instances in a headless mode so that at least graphic processing and sound processing are disabled.

[7] A method according to an embodiment of the present invention is a method that is executed by a computer to detect inter-version inconsistency of a game in which a game state can be updated according to a user operation, and the method includes:

a first acquisition step for executing the game of a first version by using a virtual instance generated to virtualize a user terminal or a software environment for the user terminal, executing gameplay on the basis of an operation log included in one game log, and acquiring game state information;

a second acquisition step for executing the game of a second version by using a virtual instance, executing gameplay on the basis of an operation log included in the one game log, and acquiring game state information; and a step for detecting inter-version inconsistency on the basis of comparison between the game state information acquired in the first acquisition step and the game state information acquired in the second acquisition step.

[8] An embodiment of the present invention is the method recited in [7], wherein the game may be a battle game, the one game log may include operation logs of a first user and a second user matched against each other, in the first acquisition step, the game of the first version may be executed by using two virtual instances, the two virtual instances may be matched against each other, gameplay may be executed in one of the two virtual instances on the basis of the operation log of the first user included in the one game log, gameplay may be executed in the other virtual instance on the basis of the operation log of the second user included in the one game log, and game state information may be acquired, and in the second acquisition step, the game of the second version may be executed by using two virtual instances, the two virtual instances may be matched against each other, gameplay may be executed in one of the two virtual instances on the basis of the operation log of the first user included in the one game log, gameplay may be executed in the other virtual instance on the basis of the operation log of the second user included in the one game log, and game state information may be acquired.

[9] A program according to an embodiment of the present invention is a program causing a computer to execute the steps in [7] or [8].

Advantageous Effects of Invention

In one aspect, a game can be inspected according to the present invention.

DESCRIPTION OF EMBODIMENTS

Figure 1:
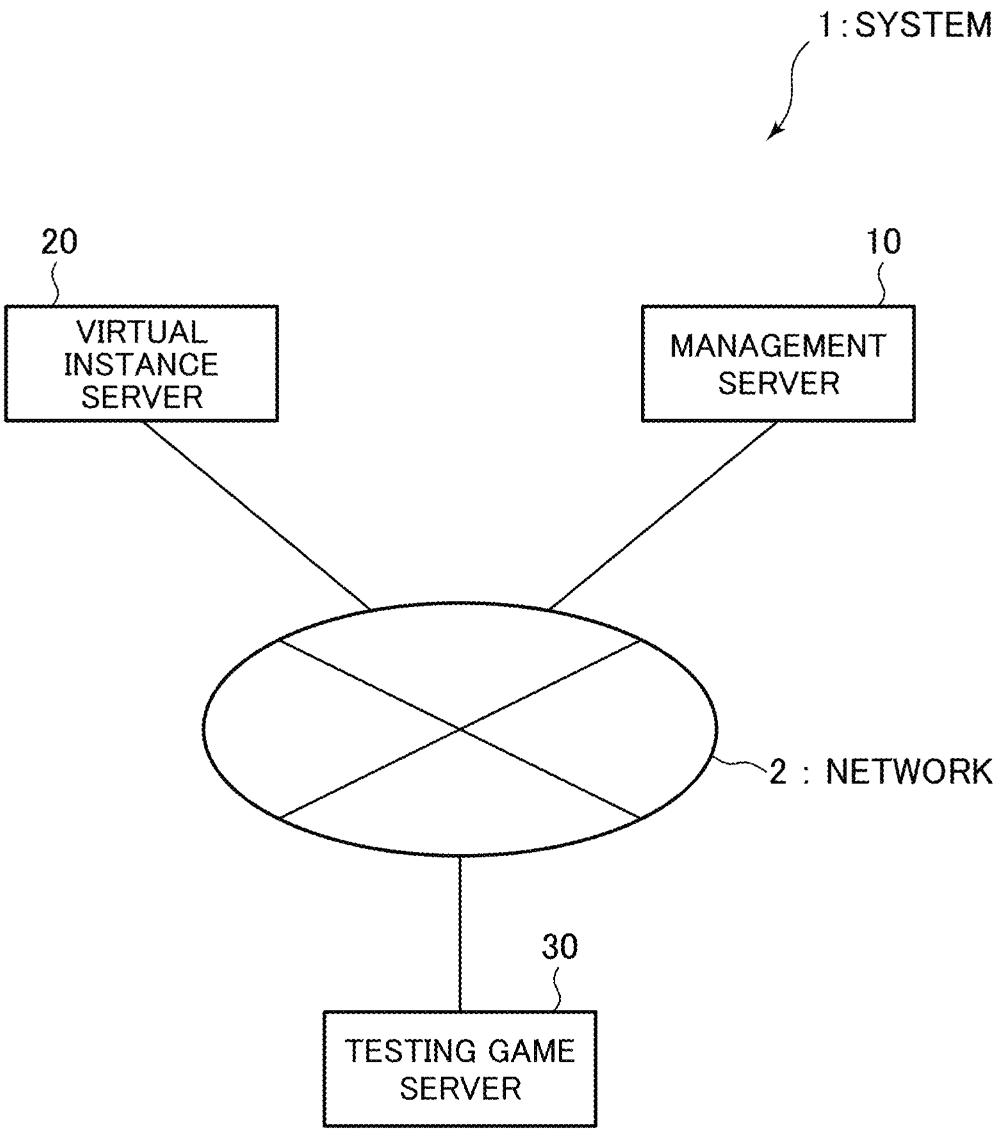
FIG. 1 is an overall configuration diagram of a system according to an embodiment of the present invention.

Embodiments of the present invention will now be described with reference to the drawings. A system according to an embodiment of the present invention detects inter-version inconsistency of a game (game program or game app) in which a board can be updated according to a user operation, thereby inspecting the game. In an embodiment according to the present invention, inter-version inconsistency of a game app indicates: a game behavior change that is not intended by the game administrator (developer) and that is caused by implementation, debugging, or library specification changes in the game app when the version of the game app is upgraded; or a game behavior difference between released implementation with behaviors that are deviated from the intention of the game administrator but have prevailed among users and implementation with originally intended behaviors due to version upgrade, etc. of the game app.

A game according to an embodiment of the present invention is a card battle game in which a board is updated when an action (attack, event, or the like) is performed on the board on the basis of a user operation. In the following explanation, the game according to an embodiment of the present invention is referred to, for example, as a "game G" for convenience in order to indicate that games of different versions are a game with the same title, but the game G is not limited to a particular game and can be an arbitrary card battle game. In an embodiment according to the present invention, the "board" is an example of a "game state", but a "game state" can represent the "board" itself. The game G according to an embodiment of the present invention is an online game that can be played on a portable terminal, such as a smartphone, and can be updated, as needed, by the game administrator. In an embodiment according to the present invention, the game G of the first version is a game that is released and that can be played by the user, whereas the game G of the second version is a game that is scheduled to be released and that has a version newer than the game G of the first version. For example, in the case where the game G of version 3 is updated to the game G of version 4, the first version is version 3, and the second version is version 4. In an embodiment according to the present invention, an "app" can mean an app installed in a smartphone or a tablet terminal, and can also mean an application in general. In an embodiment according to the present invention, a game can also mean a game program or a game app. In the present description, there are cases where explanation that is more detailed than necessary is omitted for the sake of convenience of explanation.

The game G according to an embodiment of the present invention is provided by a game server S (not shown in the figure) with a configuration similar to that of a general game server that provides online games. The game server S is a server accessed by a user terminal T (not shown in the figure), such as a smartphone, when the user actually plays a game. For example, the user terminal T connects to the game server S via a predetermined game app A, and when identified and authenticated by using a user ID, a password, etc., the user can play the game G as a user having the user ID via the user terminal T. A testing game server 30 can have the same configuration as the game server S but differs from the game server S in that the testing game server 30 accepts accesses only by a virtual instance server 20. The game G provided by the game server S is the game G of the first version.

The game server S stores a game application (game program) and is connected via a network to the user terminal T of each of the users who play the game. While each user is executing the game app A installed in the user terminal T, the user terminal T communicates with the game server S, and the game server S provides game services via the network. The game server S accepts, from the user, a request for starting a battle game via the user terminal T, matches two users (the first user and the second user) against each other, and starts the battle game. One battle game starts when two users are matched against each other, and ends when a game win/loss is decided, the game is declared a draw, or the game is declared a no contest. Note that, in the present description, a battle game may be expressed just as a battle in some cases.

Figure 8:
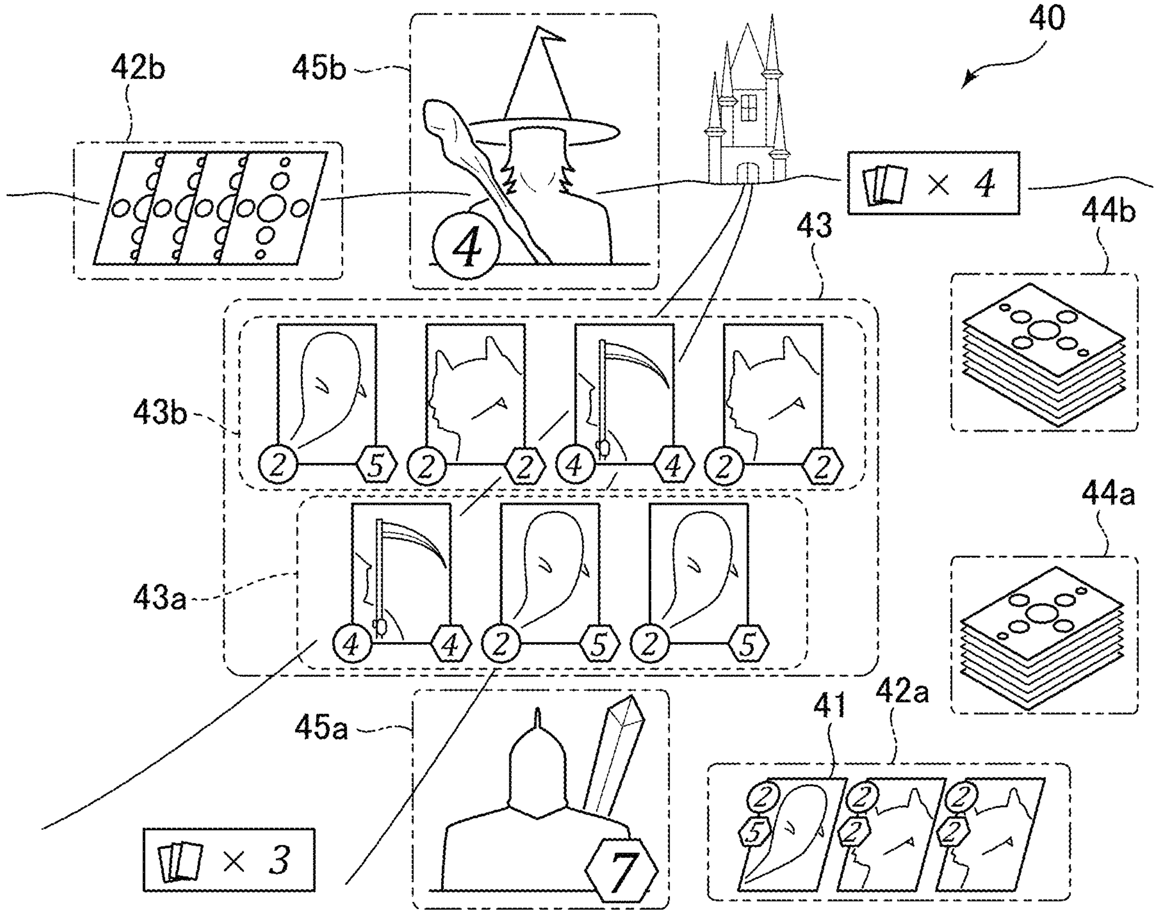
FIG. 8 is a diagram showing an example of a game screen of a game G displayed on a display of a user terminal T.

FIG. 8 is a diagram showing an example of a game screen 40 of the game G displayed on the display of the user terminal T. The game screen 40 shows a game screen of a card battle between the current user and another user. The game G according to an embodiment of the present invention proceeds such that the user selects a card from a possessed card group configured to include a plurality of cards and puts that card on a game field 43, thereby causing various events to be executed according to the combination of cards or classes. The game G is a battle game in which the current user, namely, the user himself/herself who operates the user terminal T, and another user who operates another user terminal T combat against each other by selecting cards from the respective possessed card groups and put those cards on the game field 43. In an example, each card 41 in the game G has card definition information including parameters, such as a card ID, a card type, hit points, attacking power, and properties, and each class in the game G has class definition information.

The game screen 40 shows a first card group 42*a* serving as the current user's hands and a first card group 42*b* serving as the other user's hands. The first card group 42*a* and the first card group 42*b* include a card 41 with which a character, an item, or a spell is associated. The game G is configured so that the current user cannot recognize the cards 41 of the first card group 42*b* of the other user. The game screen 40 also shows a second card group 44*a* serving as the current user's stock and a second card group 44*b* serving as the other user's stock. Note that the current user or the other user does not need to be a real player but may be operated by a computer such as a game AI.

The possessed card group possessed by each user is composed of the user's hands 42 (42*a* or 42*b*) and the user's stock 44 (44*a* or 44*b*), and is called a card deck in general. Whether each of the cards 41 possessed by the user is included in the hands 42 or the stock 44 is decided according to the proceeding of the game. The hands 42 constitute a group of cards that can be selected by the user and put on the game field 43, whereas the stock 44 is a group of cards that cannot be selected by the user. Although the possessed card group is composed of a plurality of cards 41, the possessed card group is composed of one card 41 in some cases depending on the proceeding of the game. Note that the card deck of each user is composed of cards 41, all of which may be different kinds of cards 41 or some of which may be the same kind of cards 41. In addition, the kind of a card 41 constituting the card deck of the current user may differ from the kind of a card 41 constituting the card deck of the other user. Furthermore, the possessed card group possessed by each user may be composed of only the hands 42.

The game screen 40 shows a character 45*a* selected by the current user and a character 45*b* selected by the other user. Each of the characters 45*a* and 45*b* selected by the users differs from the characters associated with cards, and defines a class indicating the type of the possessed card group. In an example, the game G is configured so that the cards 41 possessed by the user differ according to the class. In an example, the game G is configured so that the kinds of cards that can constitute the card deck of each user differ according to the class. It should be noted, however, that the game G can be configured not to include a class. In this case, the game G can be configured so as not to be limited by the class as described above, thus not displaying, on the game screen 40, the character 45*a* selected by the current user and the character 45*b* selected by the other user.

While the user terminal T is executing the game app A, namely, while the user terminal T is executing the game G, the game server S stores a game log, which is log data concerning the game. A game log includes a replay log, which is a log that allows playback of user operations performed by each of the users combatting against each other, and includes operation logs of the first user and the second user matched against each other.

The game G according to an embodiment of the present invention is a battle game in which one battle (card battle) includes a plurality of turns. In an example, in each of the turns of the game G, the current user or the other user can attack the opponent's card 41 or character 45 by performing an operation, such as selecting one of his/her own cards 41, or can cause a predetermined effect or event to occur by using one of his/her own cards 41. In an example, in the case where the current user launches an attack by selecting a card 41 in the game G, the current user can select the opponent's card 41 or character 45 as an attacking target. In an example, in the case where the current user launches an attack by selecting a card 41 in the game G, an attacking target is automatically selected depending on the card. In an example, in the game G, in response to a user operation performed on one card or character on the game screen 40, parameters, such as hit points and attacking power, of another card or character are changed. In an example, in the game G, in the case where the board satisfies a predetermined condition, the card 41 corresponding to that predetermined condition is excluded from the game field 43 or is moved to the card deck of the current user or the other user. For example, a replay log can exhaustively include the history of information as described above.

In an embodiment according to the present invention, a game log stored by the game server S includes a per-battle replay log, which is a log that allows playback of user operations performed by each of the users combatting against each other. For example, the replay log (game log) of one battle is a replay log (game log) from a battle start to a battle end or a replay log (game log) from a battle start to a battle interruption. A replay log includes data for actions.

In an example, a per-battle replay log includes information concerning the cards 41 selected by each of the users in each of the turns and the attacks associated with the selected cards. In an example, a per-battle replay log includes information concerning the cards 41 selected by each of the users in each of the turns and predetermined effects that have occurred in association with the selected cards.

Board information indicates at least information (visually) recognizable by the user through gameplay, such as through game operations and display on the game screen. Board information includes data concerning the cards 41 put on the game field 43. Each of the items of board information is data corresponding to the board at different times in the course where the game proceeds. Board information not only can include information concerning the cards 41 of the first card group 42*a* (or possessed card group) of the current user, but also can include information concerning the cards 41 of the first card group 42*b* (or possessed card group) of the other user. A game log includes board information history data for recording changes in the board, and the game log, therefore, includes board information at the start of each of the battles and board information at the end of the battle. The board information history data is stored so as to be associated with the replay log of each of the battles.

Data for actions includes operations (inputs) selected or decided by a user and details decided (executed) by the game program (game server S) in response to these operations. Data for actions included in a replay log includes operation logs that are data indicating operations performed by the users (e.g., user inputs related to gameplay). An action is executed on the basis of a user operation on a certain board and can change that board. A user operation is, for example, the user selecting a card 41 or the like, and an action is executed as a result of the user selecting the card 41 or the like. Each of the items of data for actions included in a replay log is data corresponding to an action executed on the basis of a user operation on each board.

In an example, one action is an attack launched by one card 41 or character 45 on another card 41 or character 45. In this case, for example, data for actions includes a card 41 or a character 45 of the attacker selected via a user operation and a card 41 or a character 45 serving as an attacking target, as well as the amount of attack (amount of damage). In an example, one action is the occurrence of a predetermined effect brought about by one card 41 or character 45. In this case, for example, data for actions includes a card 41 that brings about a predetermined effect as a result of being selected via a user operation and a card 41 or a character 45 that is subjected to the effect, as well as the amount of the effect (e.g., amount of recovered hit points).

In an example, a replay log is defined by a series of data for actions executed on each of the boards. A replay log $\mathrm{Replaylog}_n$ of one battle is an array including chronologically arranged actions and a final state, which indicates a finally decided win/loss, in that order and can be represented by expression (1).

$$Replaylog_n := [\mathrm{Action}_o, \mathrm{Action}_1 \ldots , \mathrm{Win\_Lose}] \quad (1)$$

Here, $\mathrm{Replaylog}_n$ indicates the n-th replay log (e.g., the n-th battle), $\mathrm{Action}_i$ indicates the i-th action that has been executed, and Win_Lose indicates a state in which a game win/loss is decided, the game is declared a draw, or the game is declared a no contest.

In an example, board information history data is defined by a series of board information generated by playing a battle game. Board information history data $\mathrm{Statelog}_n$ of one battle can be represented by expression (2).

$$Statelog_n := [\mathrm{State}_o, \mathrm{State}_1 \ldots , \mathrm{State}_e] \quad (2)$$

Here, $\mathrm{State}_i$ indicates the i-th board information. $\mathrm{State}_0$ indicates board information at the start of the battle, and $\mathrm{State}_e$ indicates board information at the end of the battle including a state in which a game win/loss is decided, the game is declared a draw, or the game is declared a no contest.

In an example, $\mathrm{State}_i$ is a set of the cards 41 put on the game field 43 and the cards 41 possessed by the users, and can be represented by expression (3).

$$\mathrm{State}_i := \left[\mathrm{card}_0^{sp1}, \ldots , \mathrm{card}_{na}^{sp1}, \mathrm{card}_0^{sp2}, \ldots , \mathrm{card}_{nb}^{sp2}, \mathrm{card}_0^{dp1}, \ldots , \mathrm{card}_{nc}^{dp1}, \mathrm{card}_0^{dp2}, \ldots , \mathrm{card}_{nd}^{dp2} \ldots, \mathrm{Other\_State}_i^X\right] \quad (3)$$

Here, $$\mathrm{card}_0^{sp1}, \ldots , \mathrm{card}_{na}^{sp1}$$

represents the 0-th card to the na-th card of the first user (first mover) put on the game field 43, $$\mathrm{card}_0^{sp2}, \ldots , \mathrm{card}_{nb}^{sp2}$$

represents the 0-th card to the nb-th card of the second user (second mover) put on the game field 43, $$\mathrm{card}_0^{dp1}, \ldots , \mathrm{card}_{nc}^{dp1}$$

represents the 0-th card to the nc-th card put in the hands of the first user (first mover), and $$\mathrm{card}_0^{dp2}, \ldots , \mathrm{card}_{nd}^{dp2}$$

represents the 0-th card to the nd-th card put in the hands of the second user (second mover). For example, in the case where the number of cards of the first user put on the game field 43 is one, $\mathrm{State}_i$ has only data of $$\mathrm{card}_0^{sp1}$$

as a card of the first user put on the game field 43. In the case where the number of cards of the first user put on the game field 43 is zero, State; includes data indicating that there are no cards as a card of the first user put on the game field 43. The same also applies to cards of the second user put on the game field 43, cards put in the hands, etc.

$$\text{Other\_State}_i^X$$

is information other than the cards 41 themselves, and indicates data, such as predetermined points associated with a card 41 or a character 45.

In an example, each card $card_i$ is represented by expression (4).

$$card_i := \{\text{name, explanation}\} \quad (4)$$

Here, "name" is text data indicating the name of a card, and "explanation" is text data explaining abilities and skills of the card.

FIG. 1 is an overall configuration diagram of a system 1 according to an embodiment of the present invention. As shown in FIG. 1, the system 1 includes a management server 10, the virtual instance server 20, and the testing game server 30. The management server 10, the virtual instance server 20, and the testing game server 30 are connected to one another via a network 2, such as the Internet, and can communicate with one another.

An embodiment according to the present invention uses a virtual environment in which all elements constituting the game services of the system 1 are virtualized. For example, each of the management server 10, the virtual instance server 20, and the testing game server 30 is realized by a virtual server, such as a virtual machine or a cloud system. For technologies concerning a virtual environment, technologies described in, for example, Japanese Unexamined Patent Application, Publication No. 2021-145939 can be used. The system 1 may be one device or may be configured to include a plurality of devices. For the sake of convenience of explanation, the following explanation of the hardware configuration assumes that each of the management server 10, the virtual instance server 20, and the testing game server 30 is realized by one device.

Figure 2:
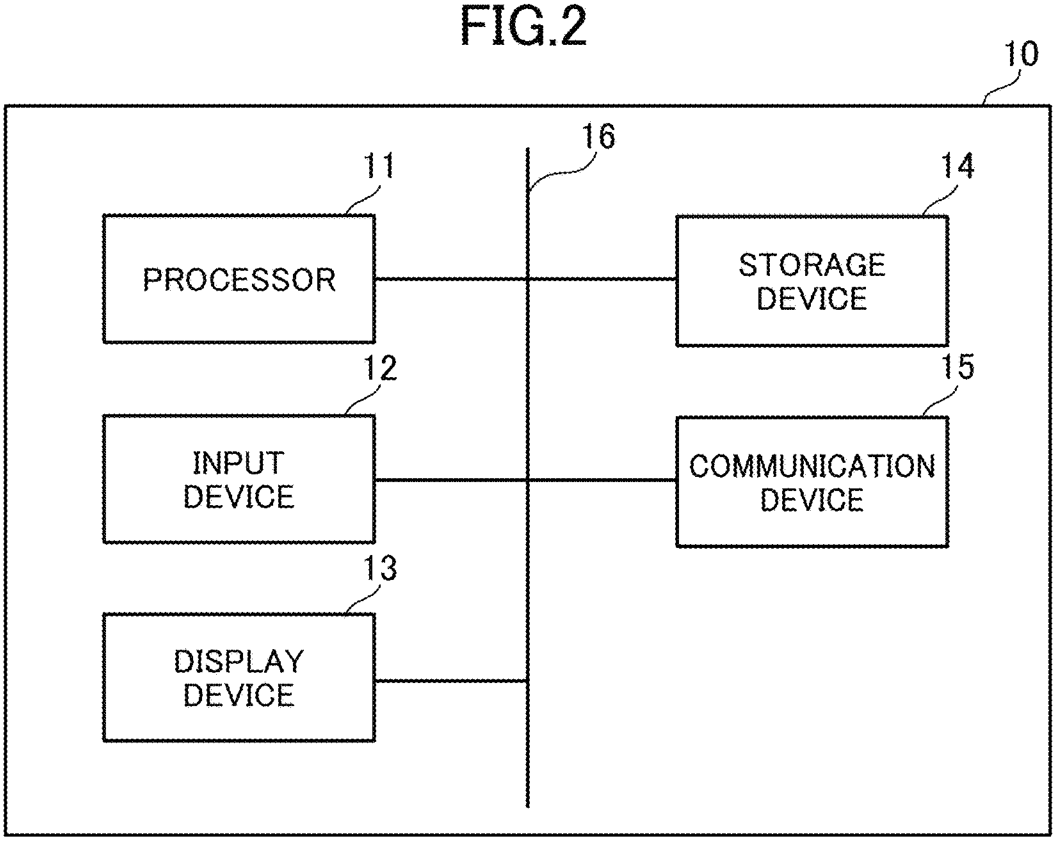
FIG. 2 is a block diagram showing the hardware configuration of a management server according to an embodiment of the present invention.

FIG. 2 is a block diagram showing the hardware configuration of the management server 10 according to an embodiment of the present invention. The management server 10 includes a processor 11, an input device 12, a display device 13, a storage device 14, and a communication device 15. These constituent devices are connected to one another via a bus 16. It is assumed that interfaces are interposed, as needed, between the bus 16 and the individual constituent devices.

The processor 11 controls the overall operation of the management server 10. For example, the processor 11 is a CPU. The processor 11 executes various kinds of processing by loading programs and data stored in the storage device 14 and executing the programs. The processor 11 may be composed of a plurality of processors.

The input device 12 is a user interface for accepting inputs to the management server 10 from the user, and is, for example, a touchscreen, a touchpad, a keyboard, a mouse, or a button. The display device 13 is a display for displaying application screens, etc. to the user of the management server 10 under the control of the processor 11.

The storage device 14 includes a main storage device and an auxiliary storage device. The main storage device is, for example, a volatile memory that allows high-speed reading and writing of information and is used as a storage area and a work area when the processor 11 processes information. The auxiliary storage device stores various programs, as well as data that are used by the processor 11 when the individual programs are executed. The auxiliary storage device is a nonvolatile storage or a nonvolatile memory, is a flash memory, such as an eMMC, a UFS, and an SSD, and may be detachable.

The communication device 15 is a module or a device that can transmit data to and receive data from other computers, such as a user terminal or a server, via the network. The communication device 15 can be a device, a module, or the like for wireless communication, and can be a device, a module, or the like for wired communication.

Figure 3:
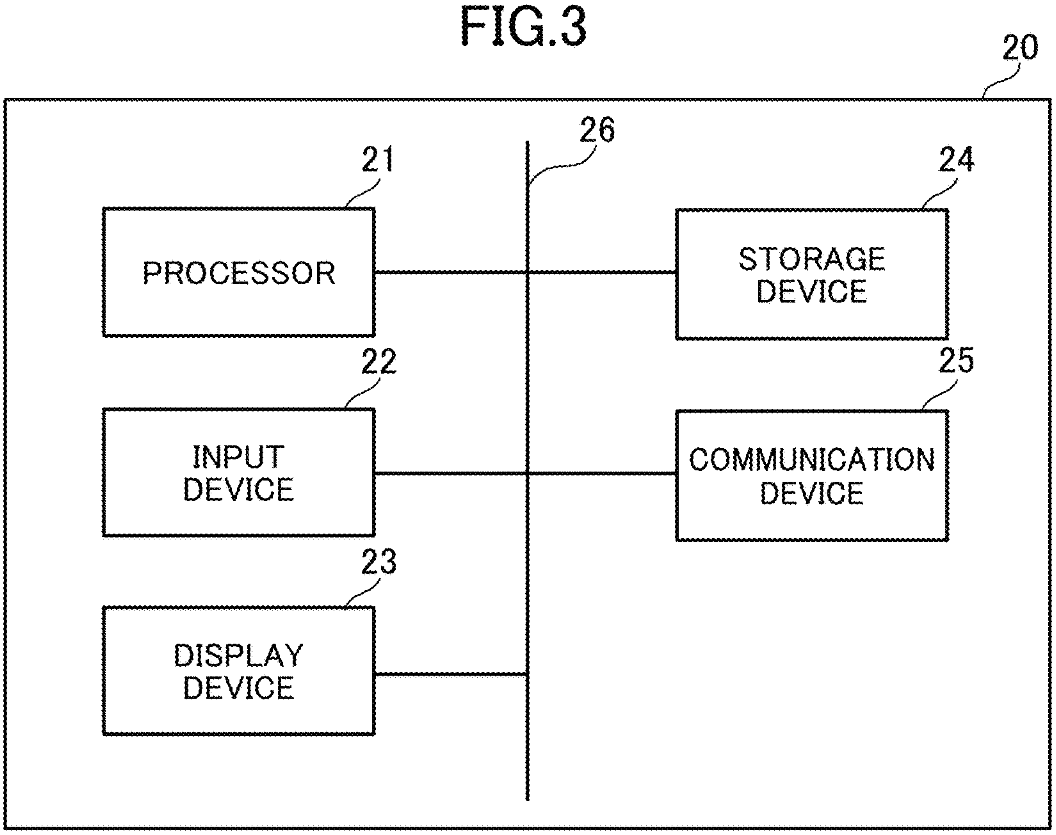
FIG. 3 is a block diagram showing the hardware configuration of a virtual instance server according to an embodiment of the present invention.

FIG. 3 is a block diagram showing the hardware configuration of the virtual instance server 20 according to an embodiment of the present invention. The virtual instance server 20 includes a processor 21, an input device 22, a display device 23, a storage device 24, and a communication device 25. These constituent devices are connected to one another via a bus 26. It is assumed that interfaces are interposed, as needed, between the bus 26 and the individual constituent devices. The processor 21, the input device 22, the display device 23, the storage device 24, and the communication device 25 correspond to, and have the same constituent elements as, the aforementioned processor 11, input device 12, display device 13, storage device 14, and the communication device 15, respectively, and thus explanation thereof will be omitted. The virtual instance server 20 does not need to include the input device 22 and the display device 23.

Figure 4:
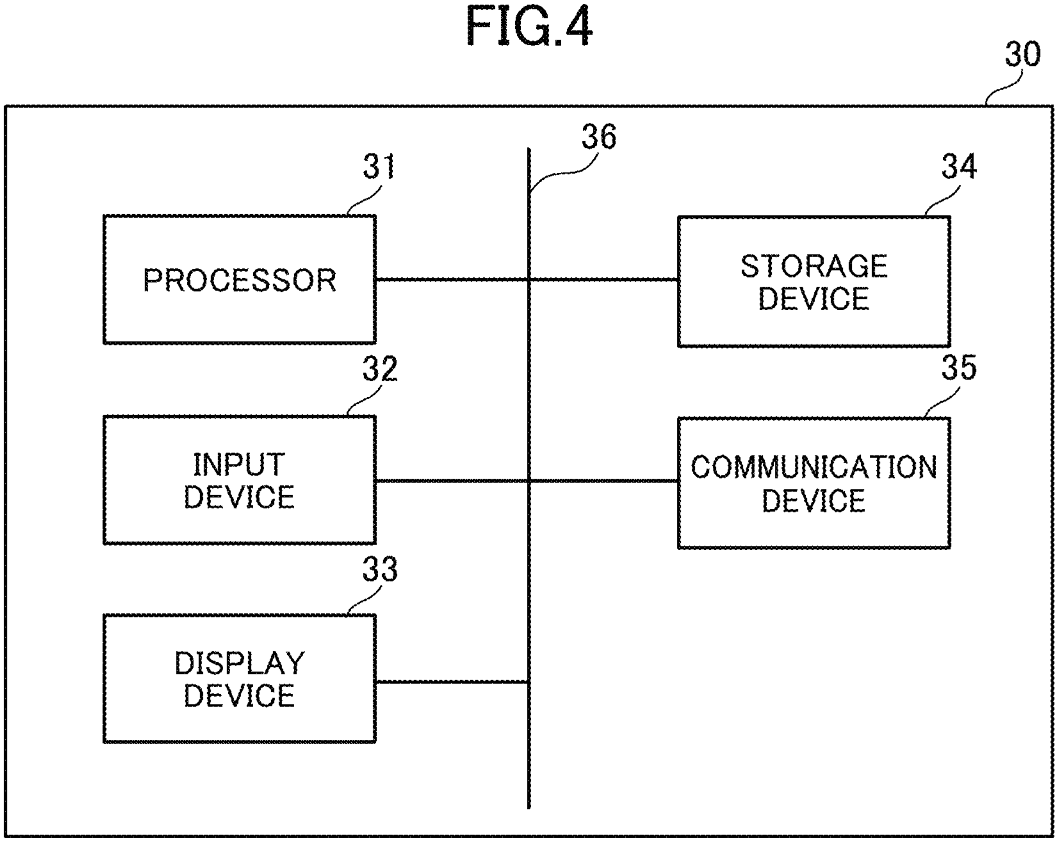
FIG. 4 is a block diagram showing the hardware configuration of a testing game server according to an embodiment of the present invention.

FIG. 4 is a block diagram showing the hardware configuration of the testing game server 30 according to an embodiment of the present invention. The testing game server 30 includes a processor 31, an input device 32, a display device 33, a storage device 34, and a communication device 35. These constituent devices are connected to one another via a bus 36. It is assumed that interfaces are interposed, as needed, between the bus 36 and the individual constituent devices. The processor 31, the input device 32, the display device 33, the storage device 34, and the communication device 35 correspond to, and have the same constituent elements as, the aforementioned processor 11, input device 12, display device 13, storage device 14, and communication device 15, respectively, and thus explanation thereof will be omitted. The testing game server 30 does not need to include the input device 32 and the display device 33.

The system 1 is a system for detecting inter-version inconsistency of the game G by executing the game G of the first version and the game G of the second version, causing an execution bot to play a game as operated in accordance with operation logs of two users acquired (generated) from a replay log, and comparing the history of resultant board information between the two versions.

Figure 5:
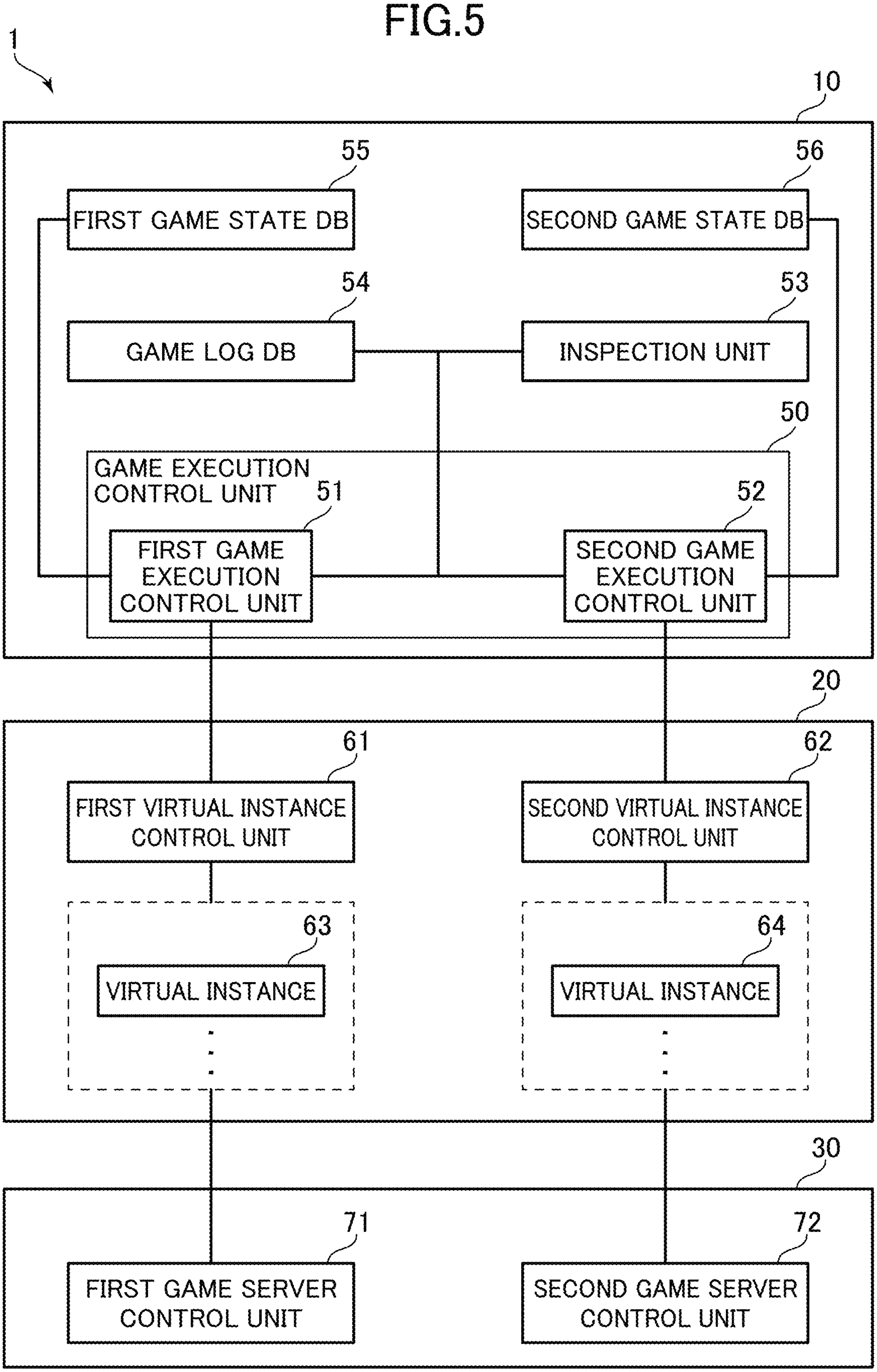
FIG. 5 is an example of a functional block diagram of the system according to an embodiment of the present invention.

FIG. 5 is an example of a functional block diagram of the system 1 according to an embodiment of the present invention. The management server 10 includes a game execution control unit 50, an inspection unit 53, a game log database (game log DB) 54, a first game state database (first game state DB) 55, and a second game state database (second game state DB) 56. The game execution control unit 50 includes a first game execution control unit 51 and a second game execution control unit 52. The virtual instance server 20 includes a first virtual instance control unit 61 and a second virtual instance control unit 62. The testing game server 30 includes a first game server control unit 71 for controlling processing for providing the game G of the first version and a second game server control unit 72 for controlling processing for providing the game G of the second version.

In an embodiment according to the present invention, the management server 10, the virtual instance server 20, and the testing game server 30 are realized in a virtual environment. However, in the case where each of the management server 10, the virtual instance server 20, and the testing game server 30 is realized by one device, these functions provided in the system 1 are realized, for example, by executing programs by means of at least one of the processor 11 of the management server 10, the processor 21 of the virtual instance server 20, and the processor 31 of the testing game server 30 and by storing, as needed, data in at least one of the storage device 14, the storage device 24, and the storage device 34 or additionally by transmitting or receiving, as needed, data among the management server 10, the virtual instance server 20, and the testing game server 30. At least one of the game log DB 54, the first game state DB 55, and the second game state DB 56, may be realized only by the storage device 14. Thus, because various kinds of functions are realized by reading programs, a portion or the entirety of one functional unit (e.g., software module) may be provided in another functional unit. In an embodiment according to the present invention, these functions provided in the system 1 can be realized through the operation of each of the constituent elements that accords with the operation of each of the management server 10, the virtual instance server 20, and the testing game server 30 as performed in the case where each of these servers is realized by one device.

The game log DB 54 stores a game log stored by the game server S. The replay log stored by the game log DB 54 is a replay log in the data format represented by expression (1). The game log DB 54 stores a replay log for each battle so as to associate board information at the start of the battle with the replay log. In an embodiment according to the present invention, the system 1 determines whether or not there is inter-version inconsistency of the game G for the replay log of each battle. The replay log of one battle to be subjected to this determination is called a target replay log. For example, the game log DB 54 can be any database as long as it stores a game log including a plurality of target replay logs for which inconsistency is to be verified and data related to those target replay logs.

The game execution control unit 50 acquires (generates), from one target replay log ($Replaylog_n$), an operation log of the first user (e.g., user serving as the first mover) and an operation log of the second user (e.g., user serving as the second mover). In an example, the game execution control unit 50 extracts, from a target replay log, a portion related to the operation logs and generates an operation log of each of the users. The game execution control unit 50 acquires board information at the start of the battle from the board information history data associated with the target replay log and generates card decks at the start of the battle between the first user and the second user.

The first game execution control unit 51 controls the operation of the first virtual instance control unit 61 and the first game server control unit 71 and causes virtual instances 63 to execute the game G of the first version and to execute gameplay on the basis of the operation logs generated from the target replay log, thereby acquiring board information. The second game execution control unit 52 controls the operation of the second virtual instance control unit 62 and the second game server control unit 72 and causes virtual instances 64 to execute the game G of the second version and to execute gameplay on the basis of the operation logs generated from the target replay log, thereby acquiring board information.

The first virtual instance control unit 61 generates, according to a control signal from the first game execution control unit 51, virtual instances 63 for virtualizing user terminals for playing a game or a software environment of the user terminals. The second virtual instance control unit 62 generates, according to a control signal from the second game execution control unit 52, a plurality of virtual instances 64 for virtualizing user terminals for playing a game or a software environment of the user terminals. A virtual instance 63 is a virtual instance for executing the game G of the first version and is configured to be connected to the first game server control unit 71 so that the game G of the first version can be executed. A virtual instance 64 is a virtual instance for executing the game G of the second version and is configured to be connected to the second game server control unit 72 so that the game G of the second version can be executed.

In an example, the first virtual instance control unit 61 generates 2N (N is a natural number) virtual instances 63 for N target replay logs, and the second virtual instance control unit 62 generates 2N (N is a natural number) virtual instances 64 for N target replay logs. The first virtual instance control unit 61 assigns a deck of the first user at the start of the battle to one of the two virtual instances 63 generated for one target replay log on the basis of board information associated with the target replay log, assigns a deck of the second user at the start of the battle to the other virtual instance 63, and causes these virtual instances 63 to transmit a battle start request to the first game server control unit 71. The second virtual instance control unit 62 assigns a deck of the first user at the start of the battle to one of the two virtual instances 64 generated for the one target replay log on the basis of board information associated with the target replay log, assigns a deck of the second user at the start of the battle to the other virtual instance 64, and causes these virtual instances 64 to transmit a battle start request to the second game server control unit 72.

Each of the virtual instances 63 and 64 is a virtual instance for virtualizing a user terminal or the software environment of the user terminal and can be realized by using a virtualization technology called a "container", such as Docker®, at the operating system level. Docker® can control a Linux® container provided by the Linux® kernel, thereby realizing virtualization on a process-by-process basis, i.e., providing a space isolated from another process in terms of the use of the CPU and the file system. Because the containers are isolated from one another, the game app can behave as if it were the only game app running on the operating system. Therefore, the execution of the game app on a user terminal can be realized virtually by executing the game app in each container and starting the process of the game app. Therefore, it is possible to generate a plurality of virtual instances on a single server device and execute a plurality of game apps simultaneously and concurrently in an isolated manner from one another, thus generating results of verification. In an embodiment according to the present invention, a "container" of Docker® is used as the virtual instances 63 and 64. For example, each of the virtual instances 63 and 64 is a virtualized smartphone.

The first game server control unit 71 selects, from the virtual instances 63 from which battle start requests have been accepted, two virtual instances 63 that will combat against each other to match them against each other, so that a battle game is executed between the matched virtual instances 63. The first game server control unit 72 selects, from the virtual instances 64 from which battle start requests have been accepted, two virtual instances 64 that will combat against each other to match them against each other, so that a battle game is executed between the matched virtual instances 64.

When the first virtual instance control unit 61 assigns a deck of the first user to one of the two virtual instances 63 generated for one target replay log and assigns a deck of the second user to the other virtual instance 63, the first game execution control unit 51 assigns the same ID to, or associate the same ID with, the two virtual instances 63. This ID can be any ID as long as it can uniquely identify the target replay log. The first game server control unit 71 is configured to match two virtual instances 63 having the same ID assigned thereto or associated therewith. Similarly, when the second virtual instance control unit 62 assigns a deck of the first user to one of the two virtual instances 64 generated for the one target replay log and assigns a deck of the second user to the other virtual instance 64, the second game execution control unit 52 assigns the same ID to, or associate the same ID with, the two virtual instances 64. The second game server control unit 72 is configured to match two virtual instances 64 having the same ID assigned thereto or associated therewith.

In an embodiment according to the present invention, the virtual instances 63 execute the game G of the first version by executing, in the headless mode, the game app A executed in order to play a game in user terminals. For example, the first game execution control unit 51 or the first virtual instance control unit 61 executes the game G of the first version by executing the game app A, which is executed in order to play a game in user terminals, in autopilot and in the headless mode in the virtual instances 63 so that at least graphic processing and sound processing are disabled. The virtual instances 64 execute the game G of the second version by executing the game app A in the headless mode. For example, the second game execution control unit 52 or the second virtual instance control unit 62 executes the game G of the second version by executing the game app A, which is executed in order to play a game in user terminals, in autopilot and in the headless mode in the virtual instances 64 so that at least graphic processing and sound processing are disabled.

The virtual instances 63 execute the game G of the first version, execute gameplay on the basis of operation logs, and output board information each time an action is executed. The virtual instances 64 execute the game G of the second version, execute gameplay on the basis of operation logs, and output board information each time an action is executed.

The first game execution control unit 51 acquires board information output by the virtual instances 63, generates board information history data indicating board information arranged in chronological order, and stores the board information history data in the first game state DB 55. The second game execution control unit 52 acquires board information output by the virtual instances 64, generates board information history data indicating board information arranged in chronological order, and stores the board information history data in the second game state DB 56. The virtual instances 63 and 64 output board information in a data format, such as JSON, XML, or CSV, that can produce differences. Board information is data represented by expression (3). The board information history data generated by the first game execution control unit 51 and the second game execution control unit 52 is board information history data in a data format represented by expression (2).

The inspection unit 53 detects inter-version inconsistency on the basis of comparison between: board information history data ($Statelog_n$) generated by the first game execution control unit 51 on the basis of board information acquired from the virtual instances 63 that execute gameplay on the basis of the operation logs generated from one target replay log; and board information history data ($Statelog'_n$) generated by the second game execution control unit 52 on the basis of board information acquired from the virtual instances 64 that execute gameplay on the basis of the operation logs generated from the same target replay log. Here, if the i-th board information $State_i$ in the board information history data ($Statelog_n$) generated by the first game execution control unit 51 does not coincide with the i-th board information $State'_i$ in the board information history data ($Statelog'_n$) generated by the second game execution control unit 52, namely, if $State_i \neq State'_i$ , then the inspection unit 53 determines that inconsistency is detected or there is inconsistency. That is, the system 1 detects that gameplay based on operation logs generated from the target replay log causes inter-version inconsistency to occur. If $State_i = State'_i$ in all i (i=0 to e), then the inspection unit 53 determines that no inconsistency is detected or there is no inconsistency.

From the above, it can be said that the inspection unit 53 is an inconsistency detection unit that detects inter-version inconsistency on the basis of comparison between: board information ($State_i$) acquired from the virtual instances 63 that execute gameplay on the basis of the operation logs generated from one target replay log; and board information ($State'_i$) acquired from the virtual instances 64 that execute gameplay on the basis of the operation logs generated from the same target replay log.

Figure 6:
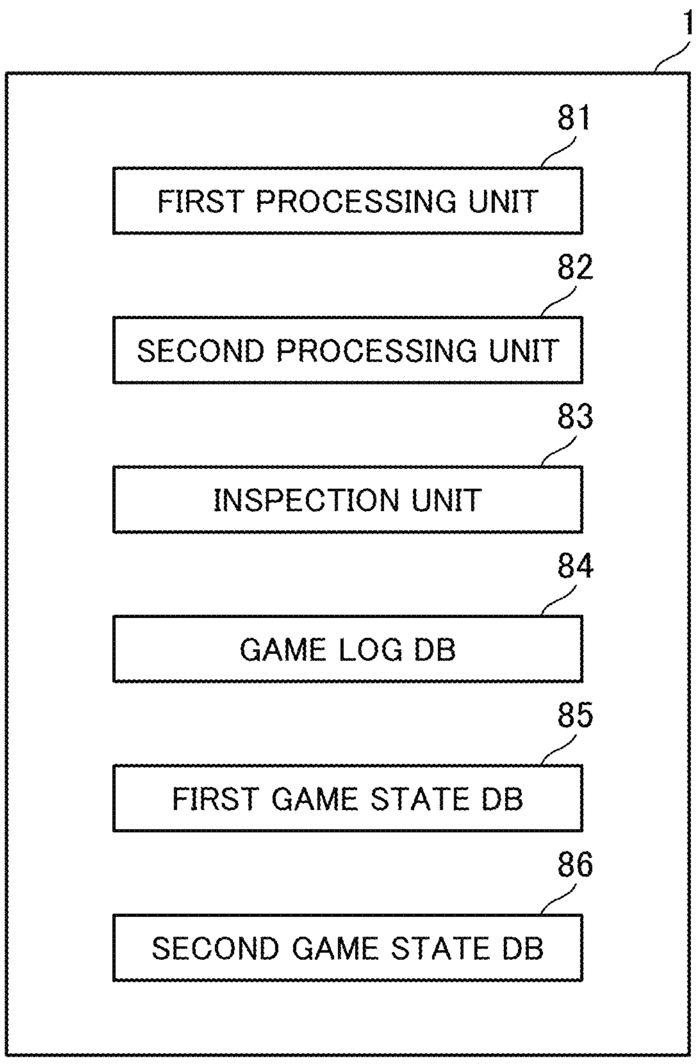
FIG. 6 is an example of a functional block diagram of the system according to an embodiment of the present invention.

FIG. 6 is an example of a functional block diagram of the system 1 according to an embodiment of the present invention from the perspective of the entire system 1. The system 1 includes a first processing unit 81, a second processing unit 82, an inspection unit 83, a game log DB 84, a first game state DB 85, and a second game state DB 86. The functional block diagram shown in FIG. 5 is an example of details of the functional block diagram shown in FIG. 6. The inspection unit 83, the game log DB 84, the first game state DB 85, and the second game state DB 86 are functional units corresponding to the inspection unit 53, the game log DB 54, the first game state DB 55, and the second game state DB 56, respectively.

The first processing unit 81 includes the first game execution control unit 51, the first virtual instance control unit 61, and the first game server control unit 71, and the second processing unit 82 includes the second game execution control unit 52, the second virtual instance control unit 62, and the second game server control unit 72.

The first processing unit 81 executes the game G of the first version by using two virtual instances 63, matches the two virtual instances 63 against each other, executes gameplay in one of the virtual instances 63 on the basis of the operation log of the first user included in the target replay log, executes gameplay in the other virtual instance 63 on the basis of the operation log of the second user included in the target replay log, and acquires board information. Similarly, the second processing unit 82 executes the game G of the second version by using two virtual instances 64, matches the two virtual instances 64 against each other, executes gameplay in one of the virtual instances 64 on the basis of the operation log of the first user included in the target replay log, executes gameplay in the other virtual instance 64 on the basis of the operation log of the second user included in the target replay log, and acquires board information. The inspection unit 83 detects inter-version inconsistency on the basis of comparison between board information ($State_i$) acquired from the first processing unit 81 and board information ($State'_i$) acquired from the second processing unit 82. In an example, each of the first processing unit 81 and the second processing unit 82 can be embodied as an execution bot that causes a game to be played as operated in accordance with the operation logs and outputs board information.

Figure 7:
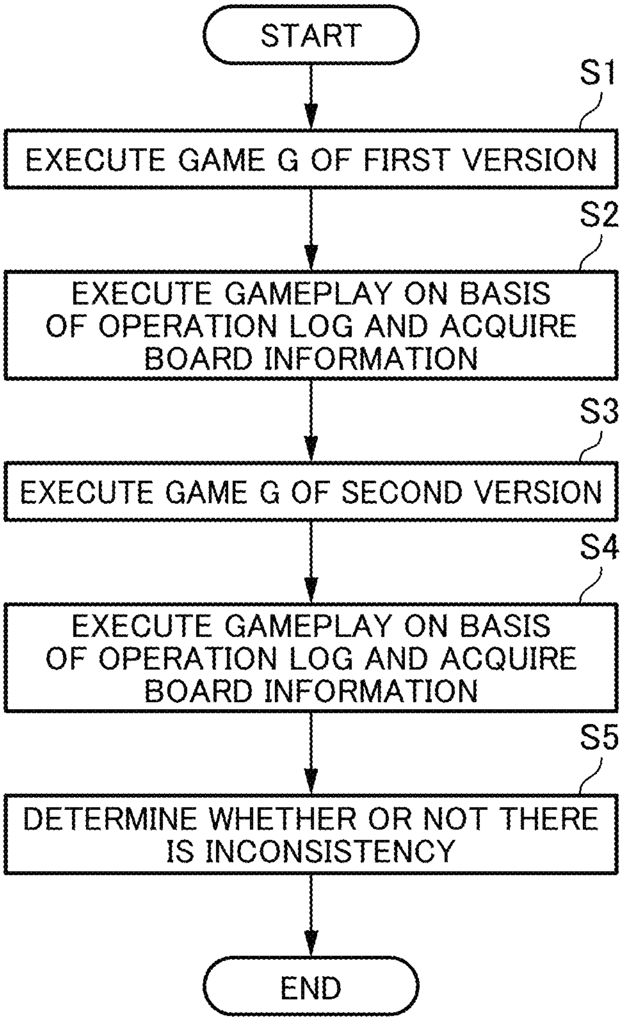
FIG. 7 is a diagram showing a flowchart of processing in the system according to an embodiment of the present invention.

FIG. 7 is a diagram showing a flowchart of processing in the system 1 according to an embodiment of the present invention.

In step S1, the first processing unit 81 executes the game G of the first version by using virtual instances 63. In step S2, the first processing unit 81 executes gameplay on the basis of the operation logs included in a target replay log by using the virtual instances 63 and acquires board information. In step S3, the second processing unit 82 executes the game G of the second version by using virtual instances 64. In step S4, the second processing unit 82 executes gameplay on the basis of the operation logs included in the target replay log by using the virtual instances 64 and acquires board information. In step S5, the inspection unit 53 determines whether or not there is inconsistency on the basis of the board information acquired in step S2 and the board information acquired in step S4 to detect inter-version inconsistency.

In this flowchart, although the execution of steps S1 and S2 needs to be started in that order, execution of steps S3 and S4 needs to be started in that order, and step S5 needs to be executed after steps S2 and S4 have been executed, the order of the other steps may be changed. Note that, in this flowchart, step S2 is executed in a state in which step S1 is executed (step S1 is executed while step S2 is executed), and step S4 is executed in a state in which step S3 is executed. For example, execution of steps S1 and S3 may be started simultaneously, and execution of steps S2 and S4 may be started simultaneously.

Main operations and advantages of the system 1 according to an embodiment of the present invention will now be described.

So far, only manual confirmation has been a practical means for detecting inter-version inconsistency of a game. However, many card battle games, such as DCCGs, involve an exploding increase in the number of card types, making it impossible to exhaustively confirm such inconsistency. Although there is a technique that can automatically detect a No Contest problem, it is unavoidable to take a large portion of the time spent on the debugging process to manually confirm inter-version inconsistency.

An embodiment according to the present invention employs a virtual environment in which virtualization of the management server 10, the virtual instance server 20, and the testing game server 30 constituting the system 1 is realized, thereby realizing functional units of the system 1, such as the first processing unit 81, the second processing unit 82, and the inspection unit 83. The first processing unit 81 reproduces a play environment for the game G of the first version, causes the game G to be played as operated in accordance with operation logs acquired (generated) from a replay log acquired by the game server S under commercial operation, and acquires (generates) board information that changes as a result of actions being executed. The second processing unit 82 reproduces a play environment for the game G of the second version, causes the game G to be played as operated in accordance with operation logs acquired (generated) from the replay log acquired by the game server S under commercial operation, and acquires (generates) board information that changes as a result of actions being executed.

With this configuration, the inspection unit 83 can detect inconsistency between different versions of the game G merely by executing pattern matching of the two items of board information. For example, because this makes it possible to mechanically identify the combination of a particular game state (board) and a particular action that causes inconsistency and, moreover, to verify inconsistency for replay logs of many users (ideally all users), all behaviors of the game software presented to end users can be exhaustively verified. Therefore, for example, with an embodiment according to the present invention, it is possible to reduce manhours needed for a debugging process of titles under long-term commercial operation.

Thus, there have been no proposed technologies for virtualizing the entire game environment including all elements from a client to the server, reproducing a play environment for the game of an arbitrary version, and finding out inter-version inconsistency by using an actual replay log.

In addition, with an embodiment according to the present invention, an enormous number of replay logs that have been dead-stored can be converted into resources for enhancements in game quality in verifying consistency of the game G between different versions.

The aforementioned operations and advantages also apply to other embodiments and modifications, unless specifically mentioned otherwise.

The system 1 according to an embodiment of the present invention may be one device. An embodiment according to the present invention can be a method or a program for realizing the aforementioned functions of the system 1 and the aforementioned information processing shown in the flowchart, or alternatively a computer-readable storage medium storing the program. In addition, an embodiment according to the present invention can be a server capable of supplying a computer with a program for realizing the aforementioned functions of the embodiment according to the present invention and the aforementioned information processing shown in the flowchart. The same also applies to other embodiments and modifications.

The system 1 according to an embodiment of the present invention is, for example, a system that can inspect the game G of different versions with the same title and, as a result, can detect inconsistency. Therefore, the system 1 according to an embodiment of the present invention can be defined as a system for inspecting a game that aims at addressing the problem of providing a system capable of inspecting a game. In this embodiment, the inspection unit 53 can be a functional unit for determining whether or not there is inconsistency by making a comparison between: board information history data ($Statelog_n$) generated by the first game execution control unit 51 from board information acquired from the virtual instances 63 that execute gameplay on the basis of the operation logs generated from one target replay log; and board information history data ($Statelog'_n$) generated by the second game execution control unit 52 from board information acquired from the virtual instances 64 that execute gameplay on the basis of the operation logs generated from the same target replay log. For example, the inspection unit 53 is configured to determine whether or not the i-th board information $State_i$ in the board information history data ($Statelog_n$) generated by the first game execution control unit 51 coincides with the i-th board information $State'_i$ in the board information history data ($Statelog'_n$) generated by the second game execution control unit 52 for all i (i=0 to e) and to output the result. In this case, the inspection unit 53 determines whether or not there is inconsistency but does not need to detect inconsistency. Regarding the above, the same also applies to the inspection unit 83.

In a modified embodiment of the present invention, the system 1 can be, for example, a system for inspecting one game. For example, in this modified embodiment, the first processing unit 81 and the second processing unit 82 execute a game of the same version. For example, in this case, the second processing unit 82 also executes the game G of the first version by using two virtual instances 64, executes gameplay in the two virtual instances 64, and acquires board information. With this configuration, it is possible to inspect a problem with the operation of the game of a certain version.

In one or a plurality of embodiments according to the present invention, a game log that is stored in the game log DB 54 and stored by the game server S can include a random-number seed value. For example, each random-number seed value is stored so as to be associated with a replay log or so as to be associated with the data for an action executed by using random numbers (data subjected to random number processing) among the data for actions included in a replay log. For example, in the case where one random-number seed value is used in generating random numbers through a certain battle game, that seed value is stored as a portion of a game log so as to be associated with a replay log acquired in the battle game. For example, in this embodiment, the first game execution control unit 51 causes virtual instances 63 to execute the game G of the first version and causes gameplay to be executed on the basis of operation logs generated from the target replay log. Furthermore, when causing the first game server control unit 71 to execute random number processing, the first game execution control unit 51 causes random number processing to be executed by using the random-number seed value associated with the target replay log or the random-number seed value associated with the data for the target action in the target replay log, thus acquiring board information. In this exemplification, processing by means of the second game execution control unit 52 is the same as processing by means of the first game execution control unit 51. In addition, for example, in this embodiment, the first processing unit 81 executes the game G of the first version by using two virtual instances 63, matches the two virtual instances 63 against each other, executes gameplay in one of the virtual instances 63 on the basis of the operation log of the first user included in the target replay log, executes gameplay in the other virtual instance 63 on the basis of the operation log of the second user included in the target replay log, and, when executing random number processing, executes random number processing by using the random-number seed value associated with the target replay log or the random-number seed value associated with the data for the target action in the target replay log, thus acquiring board information. In this exemplification, processing by means of the second processing unit 82 is the same as processing by means of the first processing unit 81. With this configuration, the same value can be set to random numbers for the first game server control unit 71 (first processing unit 81) and the second game server control unit 72 (second processing unit 82) when an action is executed. By doing so, completely identical board information can be generated through operations based on the same operation log.

In one or a plurality of embodiments according to the present invention, each of the management server 10, the virtual instance server 20, and the testing game server 30 can be configured to include one or a plurality of devices.

In one or a plurality of embodiments according to the present invention, cards 41 (card group) in the game G can be media (medium group) such as characters and items, and a possessed card group in the game G can be a possessed medium group configured to include a plurality of media possessed by the user. For example, in the case where a medium group is composed of character media and item media, the game screen 40 shows characters or items themselves as cards 41.

In one or a plurality of embodiments according to the present invention, target replay logs used to determine whether or not there is inter-version inconsistency of the game G may be replay logs of as many users as possible, may be replay logs of high-ranking users, may be replay logs of users who play the game highly frequently, or may be replay logs of arbitrarily sampled users.

In one or a plurality of embodiments according to the present invention, the game G does not need to be a card battle game. In an example, the game G can be a game for a single user. In the case where the game G is a game for a single user, a game log that is stored in the game log DB 54 and that is stored by the game server S includes a replay log that serves as a log that allows playback of user operations of the single user. In this case, for example, the first virtual instance control unit 61 generates N virtual instances 63 for N target replay logs, and the second virtual instance control unit 62 generates N virtual instances 64 for N target replay logs. In this case, the first game server control unit 71 and the second game server control unit 72 do not execute matching of the virtual instances 63 and 64. In this case, the game execution control unit 50 generates an operation log of a single user from one target replay log. In this case, the first processing unit 81 executes the game G of the first version by using a virtual instance 63, executes gameplay on the basis of the operation log generated from the target replay log, and acquires board information. Also, the second processing unit 82 executes the game G of the second version by using a virtual instance 64, executes gameplay on the basis of the operation log generated from the target replay log, and acquires board information. Thereafter, the inspection unit 83 detects inter-version inconsistency on the basis of comparison between the board information ($State_i$) acquired from the first processing unit 81 and the board information ($State'_i$) acquired from the second processing unit. In this case, for example, because board information does not need to include information concerning the second user, the board information is data that differs from the data represented by expression (3) and that is in a format not including information concerning the second user. Thus, the system 1 according to an embodiment of the present invention can be applied to a game other than a card battle game. In the case where the game G is not a card battle game, $State_i$ and $State'_i$ acquired from the first processing unit 81 and the second processing unit, respectively, may be game state information that is not board information. The system 1 according to an embodiment of the present invention can also be applied to a card battle game in which three or more users participate.

In one or a plurality of embodiments according to the present invention, it is sufficient if the game G of the first version and the game G of the second version are a game of different versions, and the game G of different versions is not limited to a game currently released and a game scheduled to be released.

In one or a plurality of embodiments according to the present invention, the game G of the second version may be a game corresponding to a platform that differs from the platform for the game G of the first version. For example, the game G of the first version may be a game for ios, and the game G of the second version may be a game for Android. Thus, because games corresponding to different platforms are generated from binary data intended for the different platforms, operation guarantee is needed. In such an embodiment, therefore, it is also necessary to determine whether or not there is inter-version inconsistency of a game.

In an embodiment according to the present invention, the game G is assumed to be, but is not limited to, a game as a Web app. In one or a plurality of embodiments according to the present invention, the game G may be a browser game or the like.

In one or a plurality of embodiments according to the present invention, a game log that is stored in the game log DB 54 and that is stored by the game server S may include a replay log for each predetermined event or each predetermined time, instead of a replay log for each battle. In this embodiment, a target replay log is a replay log for one predetermined event or one predetermined time.

In one or a plurality of embodiments according to the present invention, a game log that is stored in the game log DB 54 and stored by the game server S does not need to include board information history data of each battle, as long as it includes board information at the start of the battle or board information at the end of the battle. In this case, the board information at the start of the battle or the board information at the end of the battle is stored so as to be associated with the replay log. In the case where the game log does not include board information at the start of the battle, the game execution control unit 50 can generate board information at the start of the battle from the replay log and the board information at the end of the battle, and the first virtual instance control unit 61 and the second virtual instance control unit 62 can assign a deck at the start of the battle to the virtual instances 63 and 64.

In one or a plurality of embodiments according to the present invention, a replay log can include board information at the start of the battle and board information at the end of the battle. In this case, the game log does not need to include board information history data of the battle.

In one or a plurality of embodiments according to the present invention, data for actions included in a replay log does not need to include details decided by the game program via a user operation. In this case, the data for actions is an operation log of the user.

In one or a plurality of embodiments according to the present invention, the first virtual instance control unit 61, instead of generating two virtual instances 63 for one target replay log, may select two virtual instances from pre-generated virtual instances with which gameplay has not been executed, assign a deck of the first user at the start of the battle to one of the two virtual instances, and assign a deck of the second user at the start of the battle to the other virtual instance. Similarly, the second virtual instance control unit 62, instead of generating two virtual instances 64 for one target replay log, may select two virtual instances from pre-generated virtual instances with which gameplay has not been executed, assign a deck of the first user at the start of the battle to one of the two virtual instances, and assign a deck of the second user at the start of the battle to the other virtual instance.

In one or a plurality of embodiments according to the present invention, the inspection unit 53 may be configured to detect inconsistency, even though $State_i$ does not completely coincide with $State'_i$ , namely, even though the equation $State_i = State'_i$ does not hold, on the basis of the degree of matching, for example, by setting an acceptable range of a difference up to ±N. With this configuration, some degree of error can be accepted by making it possible to adjust the range of an error for inconsistency detection. For example, in this case, it is possible to perform operation confirmation in an environment even closer to the actual game server S, without having to use a random-number seed value included in a game log stored by the game server S. Therefore, in this case, the game log stored by the game server S does not need to include a random-number seed value.

In an embodiment according to the present invention, the system 1 can also detect inter-version inconsistency of the game G simultaneously with a plurality of target replay logs.

In an embodiment according to the present invention, the headless mode is a mode in which graphic processing that accesses the GPU is disabled, sound processing that accesses the sound source chip is disabled, and accessing an external server is disabled. This allows the game to run in a state in which only the CPU, memory, and secondary storage device are used, i.e., in such a manner as to access only the resources enclosed inside the container, thus eliminating rate-limiting factors (factors that determine the speed) such as the speed of processing animations, which are assumed to be viewed by humans, and the speed of playing back audio, which is assumed to be heard by humans. In addition, because these graphic devices and sound devices are generally implemented as external devices outside the CPU, the headless mode can also reduce the waiting time for synchronization required for I/O processing between the CPU and these external devices. This makes it possible to run the game at high speed with no wait processing, which depends only on the processing speed of the CPU alone by eliminating wait processing required for presentation for humans and synchronization for external devices. Consequently, a battle game can be executed in a shorter time.

In one or a plurality of embodiments according to the present invention, executing a game program (game app) in the headless mode can be either executing the game program in the headless mode or executing a headless game program. Any form of execution is acceptable as long as the game can be made to proceed in a headless state. In Unity, which is a widely used game engine, it is possible to easily generate a headless game program merely by selecting the headless mode from the GUI. In other words, the game program for user terminals can be re-used to easily prepare a game program for verification. In one or a plurality of embodiments according to the present invention, the game program may be executed in the normal mode, not in the headless mode.

In one or a plurality of embodiments according to the present invention, the system 1 can be configured not to include the first processing unit 81. In this embodiment, the system 1 does not include the first game execution control unit 51, the first virtual instance control unit 61, the virtual instances 63, and the first game server control unit 71. In this embodiment, the inspection unit 83 can detect inter-version inconsistency on the basis of comparison between: board information ($State_i$) included in board information history included in a game log that is stored in the game log DB 54 and stored by the game server S; and board information ($State'_i$) acquired from the second processing unit 82. In this embodiment, it is preferable that the game log that is stored in the game log DB 54 and stored by the game server S include a random-number seed value and that, for example, in executing random number processing, the second processing unit 82 execute random number processing by using the random-number seed value associated with the data for the target action in the target replay log.

In a modified embodiment according to the present invention, each of the functional units provided in the system 1 can be realized by means of hardware by configuring electronic circuits or the like for realizing the individual functions in part or in entirety.

The processing or operation described above may be modified freely as long as no inconsistency arises in the processing or operation, such as an inconsistency that a certain step utilizes data that may not yet be available in that step. Furthermore, the examples described above are examples for explaining the present invention, and the present invention is not limited to those examples. The present invention can be embodied in various forms as long as there is no departure from the gist thereof. For example, as long as operations and advantages similar to those of the system 1 according to an embodiment of the present invention are gained, the data format of a replay log stored in the game log DB 54 is not limited to that in expression (1), the data format of the board information history data generated by the first game execution control unit 51 and the second game execution control unit 52 is not limited to that in expression (2), and board information is not limited to the data represented by expression (3).

REFERENCE SIGNS LIST

1: System
2: Network
10: Management server
11: Processor
12: Display device
13: Input device
14: Storage device
15: Communication device
16: Bus
20: Virtual instance server
21: Processor
22: Display device
23: Input device
24: Storage device
25: Communication device
26: Bus
30: Testing game server
31: Processor
32: Display device
33: Input device
34: Storage device
35: Communication device
40: Game screen
41: Card
42: Hand
42*a*, 42*b*: First card group
43: Game field
44: Stack of cards
44*a*, 44*b*: Second card group
45: Character
50: Game execution control unit
51: First game execution control unit
52: Second game execution control unit
53: Inspection unit
54: Game log DB
55: First game state DB
56: Second game state DB
61: First virtual instance control unit
62: Second virtual instance control unit
63: Virtual instance
64: Virtual instance
71: First game server control unit
72: Second game server control unit
81: First processing unit
82: Second processing unit
83: Inspection unit
84: Game log DB
85: First game state DB
86: Second game state DB

The invention claimed is:

1. A system for detecting inter-version inconsistency of a game in which a game state can be updated according to a user operation, the system comprising:

a first processing unit for executing the game of a first version by using a virtual instance generated to virtualize a user terminal or a software environment for the user terminal, executing gameplay on the basis of an operation log included in one game log, and acquiring game state information;

a second processing unit for executing the game of a second version by using a virtual instance, executing gameplay on the basis of an operation log included in the one game log, and acquiring game state information; and an inspection unit for detecting inter-version inconsistency on the basis of comparison between the game state information acquired by the first processing unit and the game state information acquired by the second processing unit.

2. The system according to claim 1, wherein the game is a battle game, the one game log includes operation logs of a first user and a second user matched against each other, the first processing unit executes the game of the first version by using two virtual instances, matches the two virtual instances against each other, executes gameplay in one of the two virtual instances on the basis of the operation log of the first user included in the one game log, executes gameplay in the other virtual instance on the basis of the operation log of the second user included in the one game log, and acquires game state information, and the second processing unit executes the game of the second version by using two virtual instances, matches the two virtual instances against each other, executes gameplay in one of the two virtual instances on the basis of the operation log of the first user included in the one game log, executes gameplay in the other virtual instance on the basis of the operation log of the second user included in the one game log, and acquires game state information.

3. The system according to claim 2, wherein the system acquires the operation log of the first user and the operation log of the second user from an acquired game log.

4. The system according to claim 3, wherein the game log of the game is a game log acquired as a result of a user playing the game of the first version.

5. The system according to claim 1, wherein the game state information is data that can be output in a predetermined format, the first processing unit and the second processing unit acquire a plurality of respective items of game state information obtained according to gameplay that is executed, and the inspection unit detects inter-version inconsistency on the basis of a degree of matching between the game state information acquired by the first processing unit and the corresponding game state information acquired by the second processing unit.

6. The system according to claim 1, wherein the first processing unit and the second processing unit execute the game in the virtual instances in a headless mode so that at least graphic processing and sound processing are disabled.

7. A method that is executed by a computer to detect inter-version inconsistency of a game in which a game state can be updated according to a user operation, the method comprising:

a first acquisition step for executing the game of a first version by using a virtual instance generated to virtualize a user terminal or a software environment for the user terminal, executing gameplay on the basis of an operation log included in one game log, and acquiring game state information;

a second acquisition step for executing the game of a second version by using a virtual instance, executing gameplay on the basis of an operation log included in the one game log, and acquiring game state information; and a step for detecting inter-version inconsistency on the basis of comparison between the game state information acquired in the first acquisition step and the game state information acquired in the second acquisition step.

8. The method according to claim 7, wherein the game is a battle game, the one game log includes operation logs of a first user and a second user matched against each other, in the first acquisition step, the game of the first version is executed by using two virtual instances, the two virtual instances are matched against each other, gameplay is executed in one of the two virtual instances on the basis of the operation log of the first user included in the one game log, gameplay is executed in the other virtual instance on the basis of the operation log of the second user included in the one game log, and game state information is acquired, and in the second acquisition step, the game of the second version is executed by using two virtual instances, the two virtual instances are matched against each other, gameplay is executed in one of the two virtual instances on the basis of the operation log of the first user included in the one game log, gameplay is executed in the other virtual instance on the basis of the operation log of the second user included in the one game log, and game state information is acquired.

9. A non-transitory computer readable medium storing a program causing a computer to execute the steps in claim 7.

* * * * *